(12) United States Patent
Mullen

(10) Patent No.: US 6,369,366 B1
(45) Date of Patent: Apr. 9, 2002

(54) PORTABLE DC AND AC ELECTRIC COOKING APPARATUS

(76) Inventor: Charles F. Mullen, 204 Yacht Club La., Seabrook, TX (US) 77586

( * ) Notice: Subject to any disclaimer, the term of this patent is extended or adjusted under 35 U.S.C. 154(b) by 0 days.

(21) Appl. No.: 09/586,432

(22) Filed: Jun. 2, 2000

Related U.S. Application Data

(60) Provisional application No. 60/137,370, filed on Jun. 3, 1999.

(51) Int. Cl.[7] .................................................. H05B 3/68
(52) U.S. Cl. ..................................... 219/450.1; 219/525
(58) Field of Search ............................ 219/200, 450.1, 219/525, 524, 472, 452.13; 99/425, 374, 346, 332, 375, 341

(56) References Cited

U.S. PATENT DOCUMENTS

| | | | | |
|---|---|---|---|---|
| 3,632,962 A | * | 1/1972 | Cherniak | 219/200 |
| 3,848,110 A | * | 11/1974 | Giguerre et al. | 219/525 |
| 3,938,431 A | * | 2/1976 | Potvin | 99/425 |
| 4,011,431 A | * | 3/1977 | Levin | 219/524 |
| 4,173,179 A | * | 11/1979 | Arthur | 99/374 |
| 5,129,313 A | * | 7/1992 | Coppier | 99/376 |
| 5,380,986 A | * | 1/1995 | Mullen | 219/472 |
| 5,615,604 A | * | 4/1997 | Chenglin | 99/332 |
| 5,845,562 A | * | 11/1998 | Deni et al. | 99/375 |
| 6,016,741 A | * | 1/2000 | Tsai et al. | 99/341 |
| 6,037,571 A | * | 3/2000 | Christopher | 219/450.1 |
| 6,062,130 A | * | 5/2000 | Brady | 99/332 |
| 6,064,042 A | * | 5/2000 | Glucksman et al. | 219/452.13 |

* cited by examiner

Primary Examiner—Teresa Walberg
Assistant Examiner—Leonid Fastovsky
(74) Attorney, Agent, or Firm—Kenneth A. Roddy

(57) ABSTRACT

A combination electric cooking apparatus capable of being selectively operated by either a D.C. or A.C. electrical power source for cooking a variety of foods. The apparatus includes a pair of hinged pan-shaped housing members which can be pivoted between a closed position superposed one above the other in opposed facing relation and an open position laterally adjacent one another. A heating plate is carried by each housing member and each plate has a central recessed flat surface surrounded by a raised side wall and a D.C. and an A.C. heating element secured to its underside, each heating element individually controlled by a separate thermostat. In the closed position, the recessed flat surfaces and raised side walls form a central cavity. In the open position, the recessed flat surface and side wall of each plate serve as a mounting surface to receive cooking vessels having mating bottoms. D.C. power may be supplied by an auxiliary battery, a vehicle battery, or a battery charger. Another aspect of the invention is a D.C. electric cooking system for vehicles and boats which are provided with an auxiliary heavy duty D.C. electrical circuit and receptacle for powering the cooker and other high wattage D.C. appliances.

18 Claims, 6 Drawing Sheets

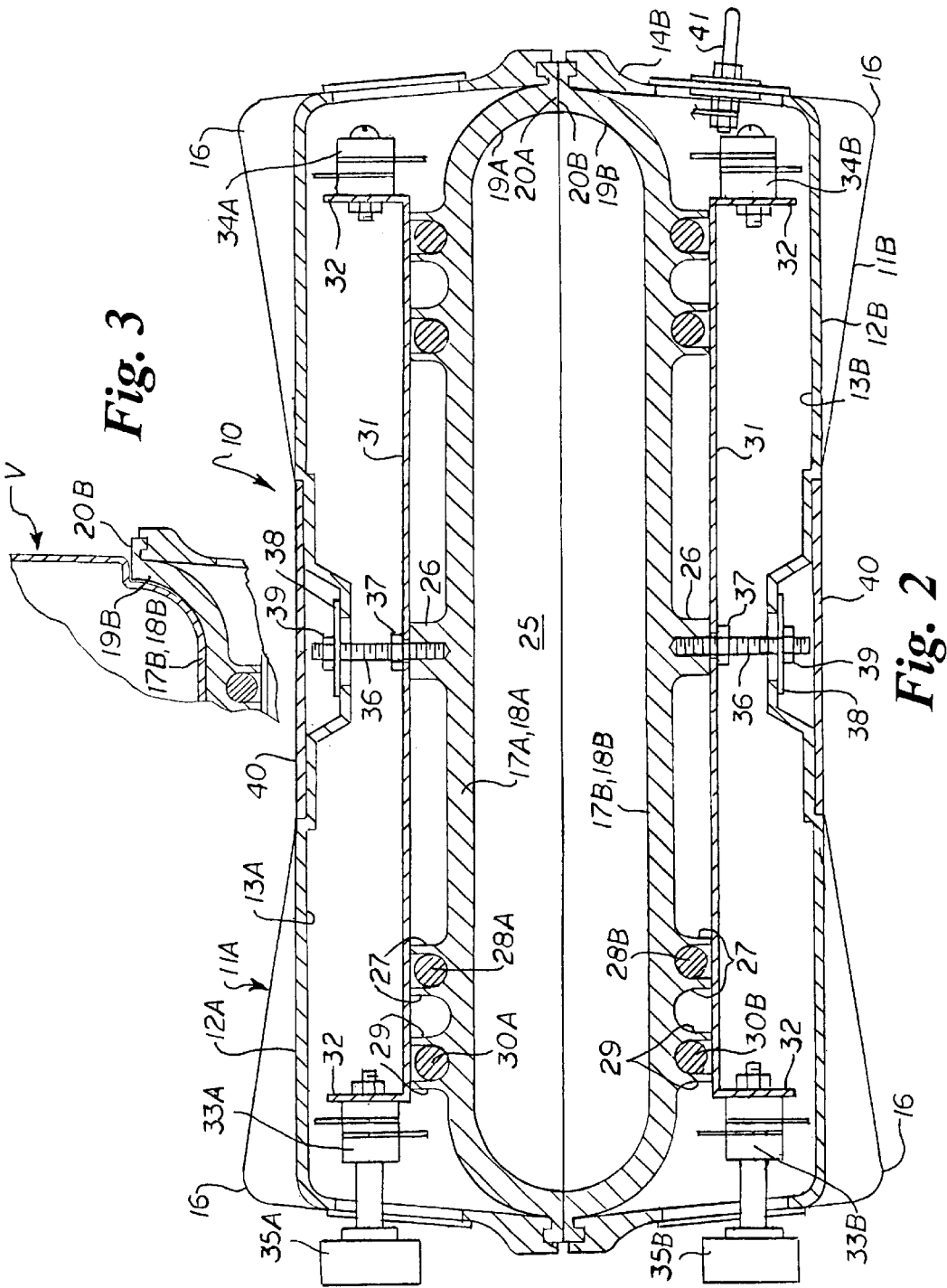

PORTABLE DC AND AC ELECTRIC COOKING APPARATUS

CROSS REFERENCE TO RELATED APPLICATION

This application claims priority of U.S. Provisional Application Ser. No. 60/137,370 filed Jun. 3, 1999.

BACKGROUND OF THE INVENTION

1. Field of the Invention

This invention relates generally to electrical fast cookers, and more particularly to a portable electric cooking apparatus selectively operated by either a D.C. or A.C. electrical power source and having hinged heating plates configured to form a cooking chamber when closed and to receive interchangeable mating cooking vessels for cooking a variety of foods.

2. Brief Description of the Prior Art

Outdoor cooking grows increasingly popular each year. Many people prepare meals while traveling on vacation and while boating and camping outdoors. Most outdoor cooking is done on a charcoal grill which can pollute the air, or on a gas grill which can be a safety hazard. Many sports fans cook in parking lots at sports stadiums prior to an event in popular "tailgate parties". Tailgate parties have become so popular that many stadiums now prohibit the use of charcoal and gas grills because of the pollution safety hazards and mess. Conventional charcoal and gas grills are also somewhat limited in the types of foods that can be prepared.

Thus, there exists a need for a small portable cooker capable of being selectively operated by conventional A.C. power or D.C. power supplied by an auxiliary battery, a vehicle or boat battery, a battery charger, or a heavy duty electrical circuit in a vehicle or boat. There is also a need for a small portable cooker that is wide ranging in its usefulness in cooking a variety of foods including sandwiches, meat, poultry, irregular shaped foods, and frozen TV dinners and for carrying out nearly all cooking requirements such as grilling, broiling, frying, baking, toasting, boiling, steaming, and pressure cooking, etc. There is also a need for a fast cooker which will cook various different types of foods at the same time.

Electrical fast cookers having a pair of hinged heating plates that can be superposed for quickly cooking hamburgers, sandwiches, waffles, pancakes, and the like, are known in the art. Prior art cookers of this type are usually powered only by common household 120V alternating current (A.C.), and are not capable of operating on direct current (D.C.) or D.C. battery power. The superposed heating plates of most prior art cookers directly contact the top and bottom surfaces of the food being cooked, thus, the types of foods and meals that can be prepared is limited.

Levin, U.S. Pat. No. 4,011,431 discloses an electric fast cooking appliance for cooking hamburgers and sandwiches which has a single heating element and a reversible grill having cooking surfaces of various configurations on opposite sides. Both sides of the reversible grill have grooves adapted to receive, in heat exchange relation, a heated rib depending from the downwardly directed cooking surface of the unit cover.

Thelander, U.S. Pat. No. 4,163,418 discloses an electric cooking appliance adapted for cooking a particular food, product called a "jaffle" (two slices of bread with filling between, the bread slices being compressed and sealed around the edges and then toasted). The appliance has a hinged upper and lower cooking plate each with a series of concavities surrounded by a circular rim and a cutting bead which cooperate when the plates are closed to compress the bread and filling, cut away the excess bread, and seal the bread slices together.

Coppier, U.S. Pat. No. 5,129,313 discloses an electric cooking appliance for toasting food which has two cooking plates hinged together. Each cooking plate is constructed of diestamped sheet metal and is attached to a sheet metal support plate that forms a heat reflector.

Boehm et al, U.S. Pat. No. 5,606,905 discloses a cooking device that has a lower cooking plate positioned at an angle to the horizontal plane of the device with grilling members supported in heat conducting relation and an upper cooking plate movable to a closed position forming a cooking chamber to restrain the escape of vapors. In one embodiment, the device includes a collecting tray positioned beneath a downwardly extending portion of the lower cooking plate with opening through which liquids emitted from the foodstuffs during cooking can be removed, and into which the foodstuffs after cooking can be collected for removal from the device.

My previous U.S. Pat. No. 5,380,986, which is hereby incorporated herein in its entirety by reference, discloses a portable multi-purpose electric fast cooking apparatus with mating cooking vessels for cooking a variety of foods wherein the cooker has a pair of hinged pan-shaped housing members that carry metallic heating plates. The heating plates each have an outward facing side with a central depressed flat surface surrounded by a raised side wall and shoulder at the top thereof which, in a closed position, define a central food cooking cavity. In an open position, the heating plates are positioned in laterally adjacent relation and the depressed flat surface, raised side wall, and shoulder of each heating plate define a mounting surface for removably receiving and supporting various cooking vessels having a bottom portion configured to mate therewith in highly efficient heat transfer relation.

Most of the prior art hinged type cooking devices operate on conventional household 120V A.C. power and do not provide a high capacity D.C. electrical heating element or circuitry capable of producing sufficient wattage to cook foods. They are also limited in that they only are used in a closed position and the temperature of the cooking surfaces are not individually controlled and only one type of food can be cooked at a time. Prior art D.C. powered devices such as bottle warmers, utilize small dry cell batteries and are also not capable of producing sufficient wattage to cook foods.

There are also numerous D.C. heaters and warmers in the prior art that are provided with a cigarette lighter jack or plug that receive power from the cigarette lighter circuit in a vehicle. However, these types of devices are not capable of producing sufficient wattage to cook foods because conventional cigarette lighter electrical circuits utilize low amperage wiring. If a D.C. cooking apparatus, such as the present invention, having a pair of D.C. electrical heating elements each with a heat output rating in the range of from about 150 watts to about 200 watts were plugged into a conventional cigarette lighter receptacle, it would destroy or severely damage the existing wiring of the cigarette lighter circuit.

The present invention is distinguished over the prior art in general, and these patents in particular by a combination electric cooking apparatus capable of being selectively operated by either a D.C. or A.C. electrical power source for cooking a variety of foods. The apparatus includes a pair of hinged pan-shaped housing members which can be pivoted between a closed position superposed one above the other in opposed facing relation and an open position laterally adjacent one another. A heating plate is carried by each housing member and each plate has a central recessed flat surface surrounded by a raised side wall and a D.C. and an A.C. heating element secured to its underside, each heating element individually controlled by a separate thermostat. In the closed position, the recessed flat surfaces and raised side walls form a central cavity. In the open position, the recessed flat surface and side wall of each plate serve as a mounting surface to receive cooking vessels having mating bottoms. D.C. power may be supplied by an auxiliary battery, a vehicle battery, or a battery charger. Another aspect of the invention is a D.C. electric cooking system for vehicles and boats which are provided with an auxiliary heavy duty D.C. electrical circuit and receptacle for powering the cooker and other high wattage D.C. appliances.

SUMMARY OF THE INVENTION

It is therefore an object of the present invention to provide a portable combination D.C. and A.C. electric cooking apparatus that can be selectively operated by conventional A.C. power or D.C. power sources.

It is another object of this invention to provide a portable D.C. and A.C. electric cooking apparatus capable of being powered by an auxiliary battery, a vehicle or boat battery, a battery charger, or a heavy duty electrical circuit in a vehicle or boat, in addition to conventional 120V A.C power.

Another object of this invention is to provide a combination D.C. and A.C. electric cooking apparatus that is small and portable, and occupies a small amount of space which is particularly useful for traveling on vacation, boating and camping outdoors, and tailgate parties.

Another object of this invention is to provide a D.C. electric cooking system for vehicles and boats that includes an auxiliary heavy duty D.C. electrical circuit and receptacle for powering the cooker and other high wattage D.C. appliances.

Another object of this invention to provide a combination D.C. and A.C. electric cooking apparatus having a pair of individually controlled hinged heating plates adapted to receive interchangeable cooking vessels which can be employed in various combinations for cooking a wide variety of foods at the same time.

A further object of this invention is to provide a combination D.C. and A.C. electric cooking apparatus having heating plates with a recessed surface adapted to receive and support interchangeable cooking vessels having bottom portions that cooperate with the heating plate in a highly efficient heat transfer relation.

A still further object of this invention is to provide a portable multi-purpose electric fast cooking apparatus which is simple in construction, economical to manufacture, and attractive in appearance.

Other objects of the invention will become apparent from time to time throughout the specification and claims as hereinafter related.

The above noted objects and other objects of the invention are accomplished by a combination electric cooking apparatus capable of being selectively operated by either a D.C. or A.C. electrical power source for cooking a variety of foods. The apparatus includes a pair of hinged pan-shaped housing members which can be pivoted between a closed position superposed one above the other in opposed facing relation and an open position laterally adjacent one another. A heating plate is carried by each housing member and each plate has a central recessed flat surface surrounded by a raised side wall and a D.C. and an A.C. heating element secured to its underside, each heating element individually controlled by a separate thermostat. In the closed position, the recessed flat surfaces and raised side walls form a central cavity. In the open position, the recessed flat surface and side wall of each plate serve as a mounting surface to receive cooking vessels having mating bottoms. D.C. power may be supplied by an auxiliary battery, a vehicle battery, or a battery charger. Another aspect of the invention is a D.C. electric cooking system for vehicles and boats which are provided with an auxiliary heavy duty D.C. electrical circuit and receptacle for powering the cooker and other high wattage D.C. appliances.

BRIEF DESCRIPTION OF THE DRAWINGS

FIG. 2 is a longitudinal side view in cross section of the portable D.C. and A.C. electric cooking apparatus, shown in the closed position.

FIG. 3 is a cross section of a portion of a heating plate and a cooking vessel mounted thereon showing the mounting arrangement.

DESCRIPTION OF THE PREFERRED EMBODIMENT

In the following discussion, the D.C. electrical components and circuitry for the cooker of the present invention is described by way of example, as a 12V D.C. system. However, it should be understood, that the present cooker may utilize other D.C. electrical components and circuitry, such as a 24V D.C., 42V. D.C., or 48V D.C. system.

Figure 1:
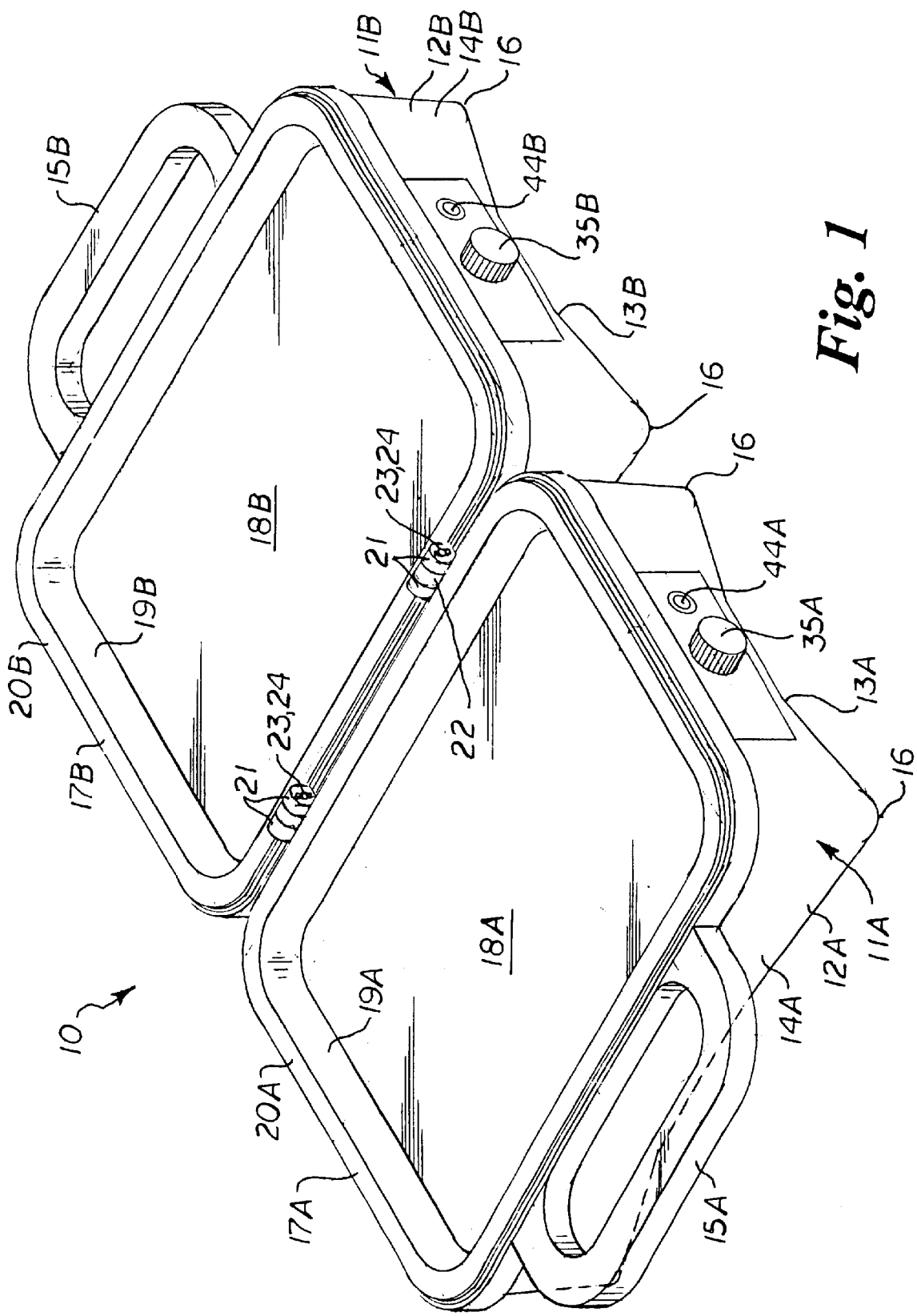
FIG. 1 is an isometric view of the hinged heating base of the portable D.C. and A.C electric cooking apparatus in accordance with the present invention, shown in an open position.

Referring now to the drawings by numerals of reference there is shown in FIG. 1, a preferred portable multi-purpose electric fast cooking apparatus 10 in the open position. FIG. 2 shows a longitudinal cross section of the portable multi-purpose electric fast cooking apparatus 10 in a closed position.

The portable multi-purpose electric fast cooking apparatus 10 has a pair of generally rectangular heating bases 11A and 11B. Each base 11A and 11B has a generally rectangular pan-shaped housing 12A and 12B, respectively, each having a bottom wall 13A and 13B, and a contiguous side wall 14A and 14B extending upwardly therefrom formed of suitable heat resistant plastic or metal material. A laterally extending handle 15A and 15B is secured to the side wall 14A and 14B of each housing 12A and 12B which serves as a carrying handle when the bases 11A and 11B are in the closed position. In the illustrated example, the bottom walls 13A, 13B are slightly concave, curving upwardly from each corner to form legs 16 at each of the four lower corners. However, it should be understood that leg members may be secured to the bottom walls 13A and 13B of each housing at their corners by conventional fastening means.

Referring additionally to FIG. 3, a metal heating plate 17A and 17B is secured to the open top end of the side wall 14A and 14B of each housing 12A and 12B. Each heating plate 17A and 17B has a central recessed flat surface 18A and 18B surrounded by a raised side wall 19A and 19B with a flat shoulder 20A and 20B, at the top end of the side walls, respectively. One longitudinal side of each heating plate 17A, 17B has a pair of ears 21 and a single ear 22 in longitudinally spaced relation. A vertical slot 23 extends transversely through the ears 21 and 22. The single ear 22 of one heating plate is received between the pair of ears 21 in the other in heating plate and a pin 24 is installed through the vertical slots 32 to form a floating hinge connection. Thus, the heating bases 11A and 11B can be pivoted between the open position (FIG. 1) and a superposed closed position (FIG. 2) and the slot 23 allows the vertical distance between the two superposed bases to be adjusted as needed to accommodate flat foods of various thickness.

When the heating plates 17A and 17B are closed, the superposed depressed flat surfaces 18A and 18B define a central cavity 25 (FIG. 2) surrounded by the raised side walls 19A and 19B and shoulders 20A and 20B. As shown in FIG. 3, the recessed flat surfaces 18A and 18B, side walls 19A and 19B, and shoulders 20A and 20B also serve as a mounting surface for receiving and engaging the contoured bottom of various cooking vessels in highly efficient heat transfer relation when the heating plates are open.

Figure 4:
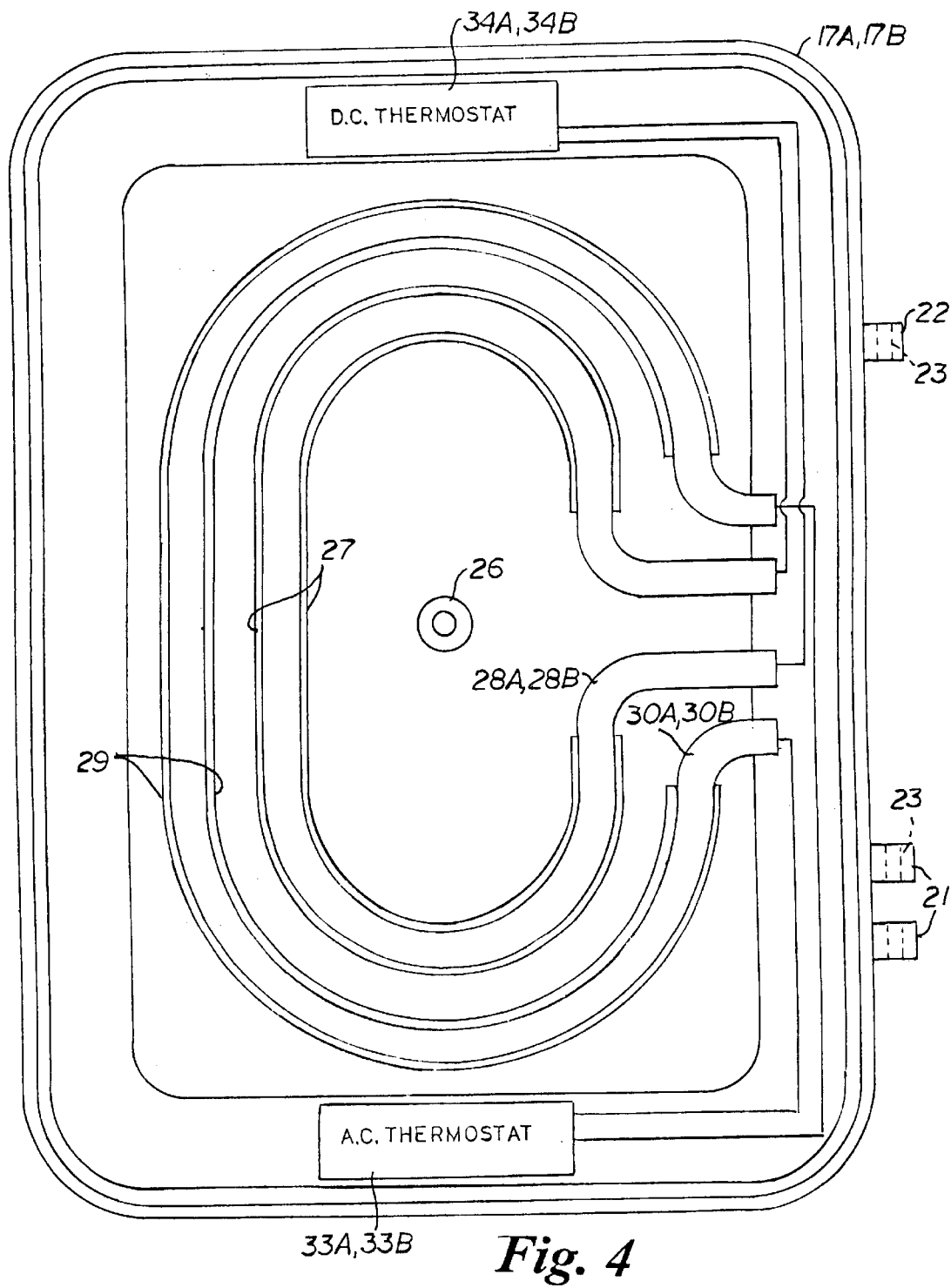
FIG. 4 is a top plan view of the underside of a heating plate of the portable D.C. and A.C. electric cooking apparatus, showing the arrangement of the D.C. and A.C. heating elements.

Referring additionally to FIG. 4, each heating plate 17A, 17B has a central threaded boss 26 depending from its underside. An inner pair of generally C-shaped parallel spaced raised ribs 27 depend from the underside of each heating plate. A generally C-shaped A.C. heating element 28A, 28B is installed in the grooves defined by the inner pair of ribs 27 of each heating plate 17A, 17B. An outer pair of generally C-shaped parallel spaced raised ribs 29 depend from the underside of each heating plate 17A, 17B in radially spaced relation to the inner pair of ribs 27. A generally C-shaped D.C. heating element 30A, 30B is installed in the grooves defined by the outer pair of ribs 29 of each plate 17A, 17B.

In a preferred 12V D.C. embodiment, each of the two D.C. electrical heating elements 30A, 30B is a 12V D.C. resistance rod-type heating element having a maximum heat output rating in the range of from about 150 watts to about 200 watts, and each of the two A.C. electrical heating elements 28A, 28B is a 120V A.C. resistance rod-type heating element having a maximum heat output rating in the range of from about 400 watts to about 500 watts. Suitable heating elements are manufactured by Chromalox Precision Heat and Control, a division of Emerson Electric Company of Pittsburgh, Pa., although other suitable types may be substituted. As seen in FIG. 2, a thin generally rectangular cover plate 31, preferably formed of aluminum, is secured over the ribs 27, 29 and heating elements 28A, 28B, 30A and 30B by conventional means to secure the heating elements in place. Each cover plate 31 has a narrow rectangular downwardly bent tongue portion 32 at each end. It should be understood that the heating elements may also be of a generally rectangular or square configuration and may be secured to the underside of each heating plate by conventional means such as brazing or welding, or may be cast into each heating plate.

A 120V A.C. thermostat 33A, 33B rated at 4 amps minimum is secured to the tongue portion 32 at one end of each cover plate 31 and a 12V D.C. thermostat 34A, 34B rated at 15 amps minimum is secured to the tongue portion xx at the opposite end of each cover plate. The A.C. thermostats 33A, 33B are manually adjustable and have a shaft that extends through an aperture in the side wall of the housings 12A and 12B with a respective temperature control knob 35A, 35B installed on their outer ends for controlling the temperature of each of the two A.C. heating elements independently. The D.C thermostats 34A, 34B may be pre-set to a predetermined temperature capacity and are not necessarily manually adjustable, since a lower wattage setting in the D.C. circuit may not be sufficient for most cooking needs. They may be provided with an adjustment screw for pre-setting the temperature capacity during assembly. Suitable A.C. and D.C. thermostats are manufactured by Bimet Corporation of Morris, Ill., although other suitable types may be substituted.

Referring again to FIG. 2, the outer edge of each heating plate 17A, 17B is supported on the top edge of the respective housing side wall 14A, 14B. A threaded shaft 36 is engaged in the boss 26 on the underside of each heating plate and extends through an aperture in the cover plates 31 and an aperture in the bottom wall 13A and 13B of each housing 12A, 12B. A nut 37 is installed on the shaft 36 and tightened against the underside of the cover plate 31 to secure it in place. A washer 38 and a nut 39 are installed on the threaded shaft 36 against the bottom wall 13A, 13B of the housings, and the nut is tightened to secure the heating plates 17A, 17B to the housings 12A and 12B. The outer nut 39 may be covered by a plug or plate 40 installed on the exterior of the bottom wall 13A, 13B. It should be understood that other means conventional in the art may be used to secure the cover plate over the heating elements and secure the heating plate to the housing.

Figure 5:
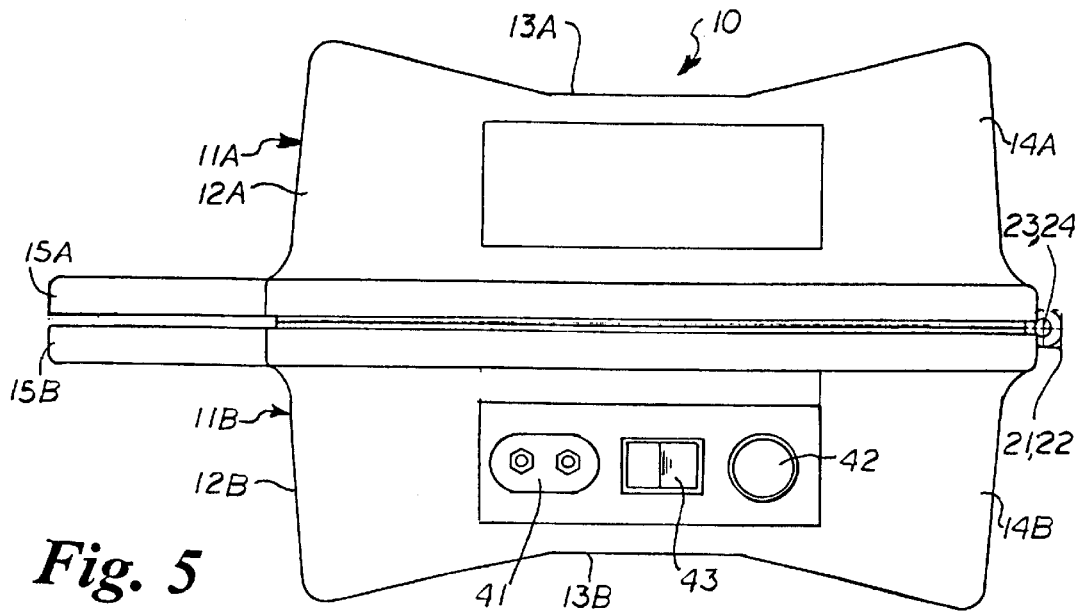
FIG. 5 is a side elevation of one end of the portable D.C. and A.C. electric cooking apparatus, showing the D.C. and A.C. power receptacles and power switch.
Figure 6:
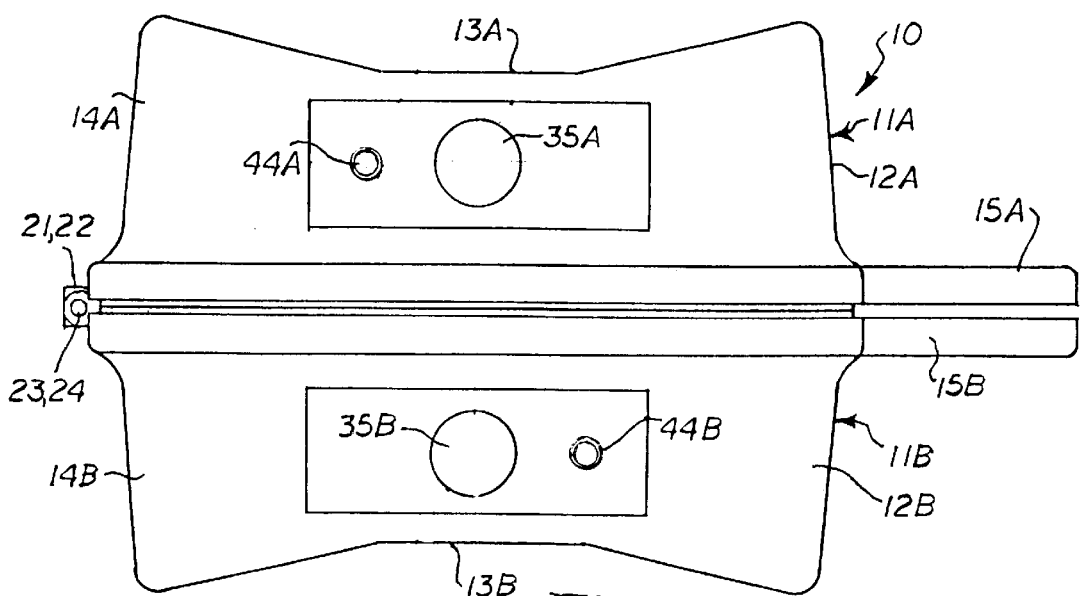
FIG. 6 is a side elevation of the end of the cooking apparatus opposite that shown in FIG. 5, showing the 120V A.C. temperature control knobs and LED indicators.

As best seen in FIG. 5 a conventional 120V A.C. electrical appliance receptacle 41 and a heavy duty 12V D.C. electrical receptacle 42 is mounted on one end of the side wall of one housing in laterally spaced relation and a heavy duty DPDT (double pole double throw) switch 43 rated at 30 amps minimum at 12V is mounted between the receptacles. The preferred DPDT switch 43 is an illuminated rocker switch, but a slide switch or toggle switch may also be used with a small LED mounted adjacent each receptacle to indicate which receptacle is being activated. The purpose of the switch 43 is to insure that it would not be possible to have both A.C. and D.C. power at the same time. As best seen in FIG. 6, at the opposite end of both housings 12A, 12B, a first and second LED 44A, 44B is mounted adjacent to the control knob 35A, 35B of a respective 120V A.C. thermostat 33A, 33B to indicate when the respective 120V A.C. heating element has reached its manually set temperature.

Figure 7:
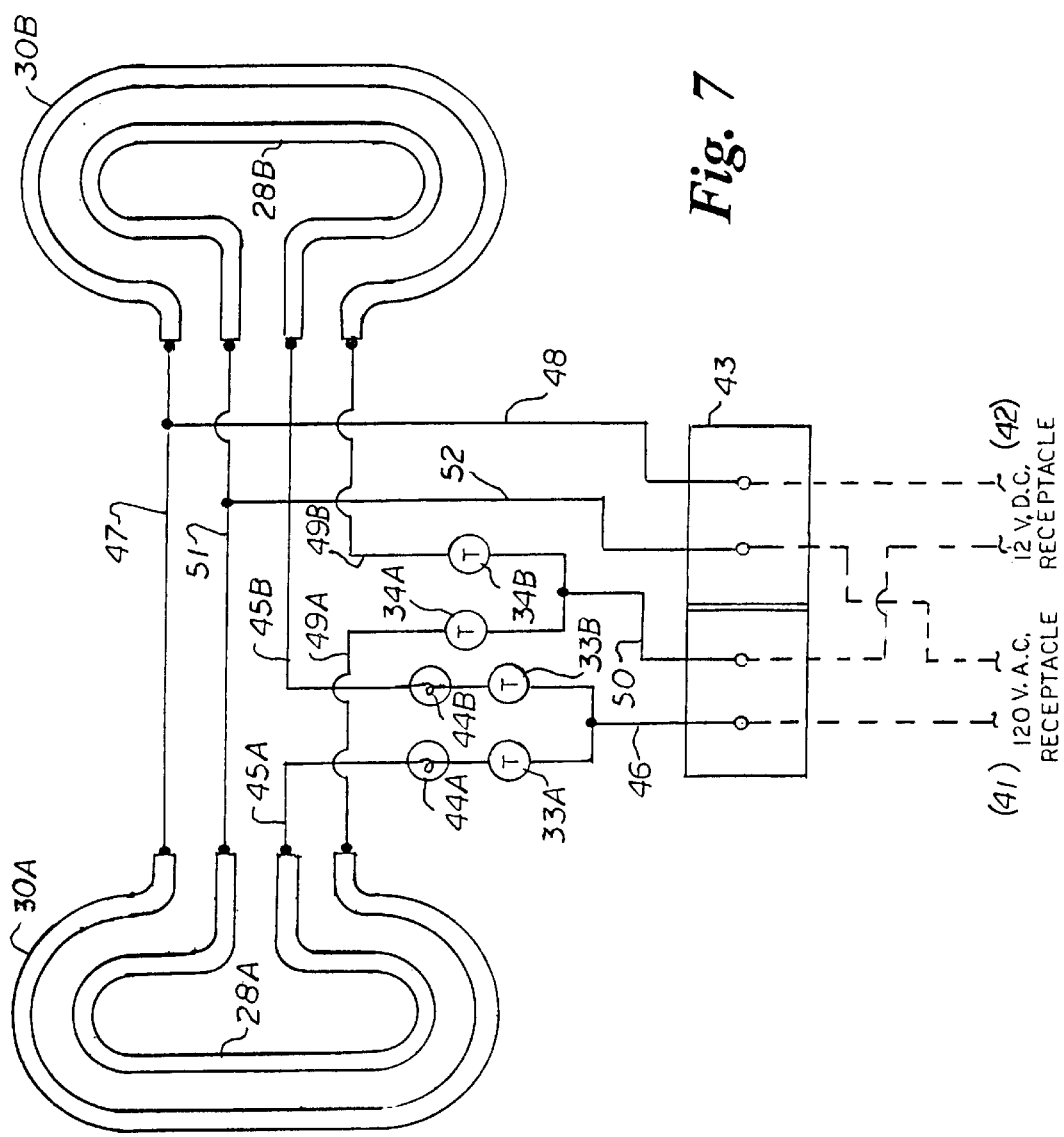
FIG. 7 is a schematic wiring diagram of the electrical circuitry of the portable D.C. and A.C. electric cooking apparatus.

FIG. 7 is an electrical schematic of the wiring diagram for the cooker. The terminals of the 120V A.C. receptacle 41 are connected by leads to the respective A.C. terminals of the DPDT switch 43, and the terminals of the 12V D.C. receptacle 42 are connected by leads to the respective D.C. terminals of the DPDT switch in a conventional manner. The first terminals of the 120V A.C. heating elements 28A and 28B are connected in parallel by leads 45A, 45B and joined to the first A.C. terminal of the DPDT switch by lead 46. The second terminals of the 120V A.C. heating elements 28A and 28B are connected in parallel by lead 47 that is joined to the other A.C. terminal of the DPDT switch 43 by lead 48. The first 120V A.C. thermostat 33A and first LED 44A are connected in series in the lead 45A between the juncture of lead 46 and first terminal of the heating element 28A. The second 120V A.C. thermostat 33B and second LED 44B are connected in series in the lead 45B between the juncture of lead 46 and the first terminal of the heating element 28B. In a preferred 120V A.C. circuit the 120V leads are 16 or 18 gauge.

The first terminals of the 12V D.C. heating elements 30A and 30B are connected in parallel by leads 49A, 49B and joined to the first D.C. terminal of the DPDT switch 43 by lead 50. The second terminals of the 12V D.C. heating elements 30A and 30B are connected in parallel by lead 51 that is joined to the other D.C. terminal of the DPDT switch by lead 52. The first 12V D.C. thermostat 34A is connected in series in the lead 49A between the juncture of lead 50 and the first terminal of the heating element 30A. The second 120V A.C. thermostat 34B is connected in series in the lead 49B between the juncture of lead 50 and the first terminal of the heating element 30B. LED's are not necessarily required in the D.C. circuit because the D.C thermostats 34A, 34B are pre-set and are not manually adjustable. In a preferred 12V D.C. circuit the 12V leads may be 10, 12, or 14 gauge. The gauge of the D.C. leads and capacity rating of the D.C. components may also vary depending upon the power source and whether system is powered by 24V D.C., 42V . D.C., or 48V D.C.

The wiring diagram and description above is exemplary, and it should be understood that other wiring arrangements known to those skilled in the art may be used. The wiring for the cooker is preferably provided in the form of a bundled insulated wiring harness, and the portion extending between the two hinged base units is surrounded by a coiled spring or other means conventional in the art to facilitate pivotal bending action and prevent bending stresses on the wiring.

An insulated power supply cord with a pair of leads connected at one end to a heavy duty D.C. plug and having battery clips at their other ends is provided for supplying 12V D.C. to the D.C. heating elements 30A, 30B through the D.C. receptacle 42. The D.C. power supply cord should be a minimum 10-gauge wire for 12V D.C. The 120V A.C. power supply cord is a conventional U.L. approved 16 or 18 gauge appliance cord with a female plug at one end and a male wall plug at its opposite end. Alternatively, rather than utilizing a D.C. and A.C. receptacle, the D.C. power supply cord and/or A.C. power supply cord may extend through a grommet in the housing side wall with their leads connected with the respective D.C. and A.C. circuits described above and their opposed ends provided with a male wall plug and battery clips, respectively.

A 12V D.C. battery may be provided with the cooking unit. A suitable D.C. battery for powering the cooking unit is a model SBS 12330 sealed rechargeable lead acid battery manufactured by SBS Storage Battery Systems of Menomonee Falls, Wis. A small battery charger may also be provided to recharge the battery when necessary. A suitable battery charger for such an application is a model 12BC2000S-1 manufactured by Cliplight Manufacturing Company of Toronto, Ontario, Canada. Other suitable batteries and battery chargers may be utilized. The cooking unit may also be powered by a conventional 12V D.C. vehicle battery by connecting the battery clips of the D.C. power supply cord to the vehicle battery terminals. The D.C. power supply cord should not be connected to a conventional cigarette lighter plug or receptacle because the wiring in the conventional automobile lighter circuit is not designed to handle the load.

Preliminary tests of a prototype cooking unit equipped with two 12V D.C. resistance rod-type heating elements, each having a maximum heat output rating of 200 watts, supplied by the Chromalox Precision Heat and Control division of Emerson Electric Company of Pittsburgh, Pa. were conducted by SBS Storage Battery Systems of Menomonee Falls, Wis., using a 12V D.C. model SBS 12330 sealed rechargeable lead acid battery to power the D.C. heating elements. 12V D.C. power was supplied to the heating elements at the rate of one minute on and one minute off for a period of sixty minutes. The battery was charged for eight hours and discharged according to the power on-off cycling routine above. This test was conducted fifty times and the battery and heating elements were found to perform very well for the intended application.

Figure 8:
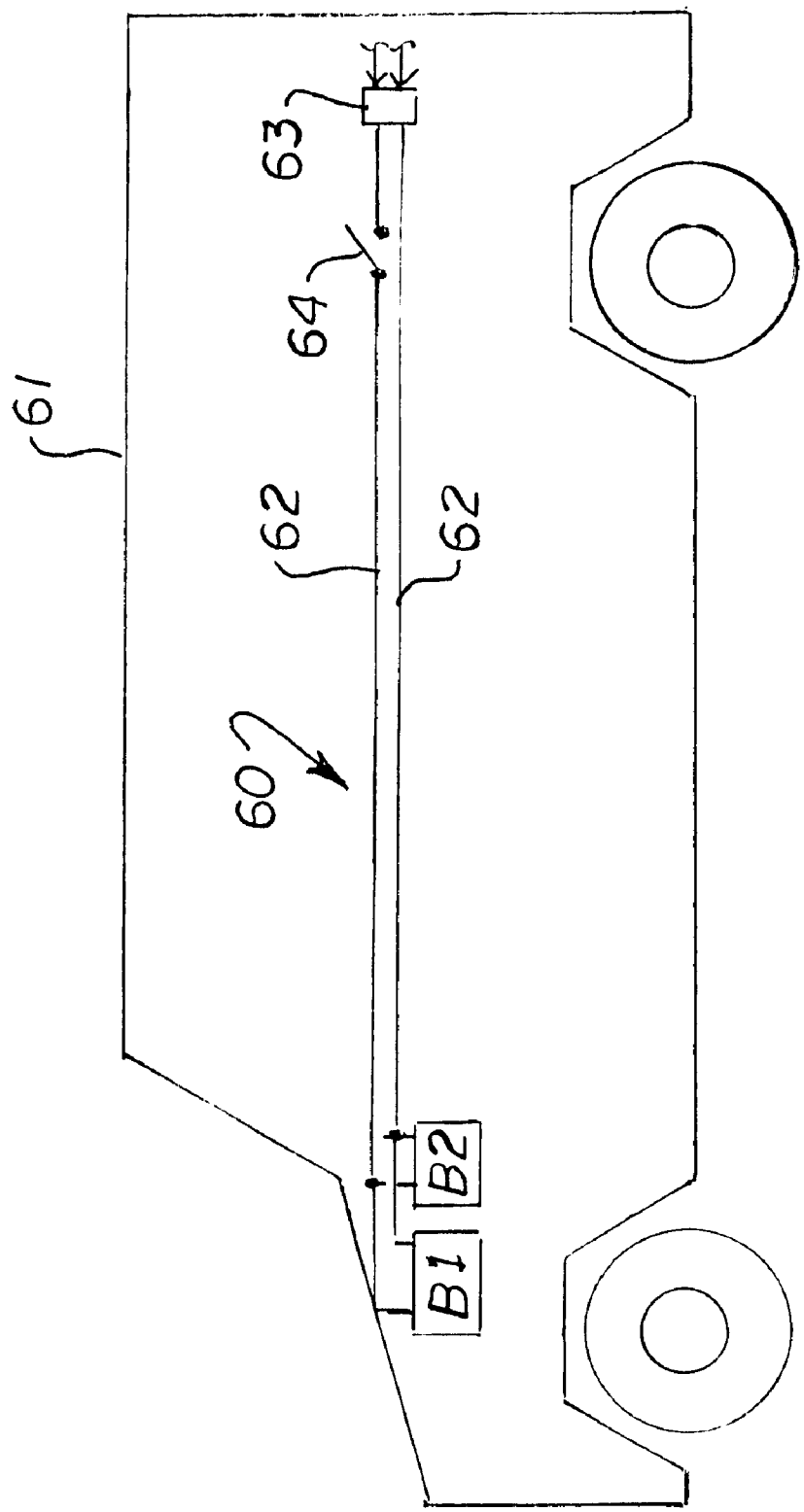
FIG. 8 is a schematic diagram of a vehicle having an auxiliary D.C. electrical accessory circuit suitable for use with the present cooking apparatus.

As shown schematically in FIG. 8, another aspect of the invention is the provision of an auxiliary electrical accessory circuit 60 in a vehicle 61 capable of supplying a D.C. voltage suitable for handling the load of one or more 12V D.C. appliances such as the 12V cooker. The 12V auxiliary electrical circuit 60 includes one or more 10 or 12 gauge minimum power supply leads 62 electrically connected with the terminals of the vehicle battery B1 or an auxiliary battery B2 and at least one heavy duty 12V D.C. electrical receptacle 63 mounted in a convenient location in or on the vehicle. For example, a heavy duty 12V D.C. electrical receptacle 63 may be mounted near the tailgate area of a van or truck or the trunk of a vehicle. A suitable heavy duty on-off switch 64 may also be provided in the circuit between the battery B1 or B2 and the heavy duty 12V D.C. receptacle 63 for controlling the supply of power to the receptacle.

It should be understood that the 12V D.C. electrical components and circuitry for the cooker of the present invention are described above, by way of example, as a 12V D.C. system, and that the present cooker may utilize other D.C. electrical components and circuitry, such as a 24V D.C., 42V. D.C., or 48V D.C. system.

My previous U.S. Pat. No. 5,380,986, hereby incorporated herein in its entirety by reference, discloses a portable multi-purpose electric fast cooking apparatus wherein the heating plates have a central depressed flat surface surrounded by a raised side wall and shoulder at the top thereof, and interchangeable mating cooking vessels having a bottom portion designed to mate with the heating plates in highly efficient heat transfer relation.

The present invention preferably has a similar mating arrangement. In addition to providing highly efficient heat transfer, the mating heating plate and cooking vessel mounting arrangement prevents or substantially reduces the likelihood of the cooking vessel moving relative to the heating plate. This feature is particularly useful when the D.C. and A.C. cooker is used in or on a vehicle or boat, outdoors, or on a vehicle tailgate.

The present D.C. and A.C. cooking apparatus may also include accessories such as a grease tray to catch drippings, and a small wire grill and several cooking vessels for cooking a variety of foods by various methods. Such accessories are shown and described in detail in my previous my previous U.S. Pat. No. 5,380,986, which is hereby incorporated herein in its entirety by reference and will not be repeated here. As described in my previous patent, the cooking vessels include a pot, and a fry pan that can also serve as a lid for the pot.

When the cooking apparatus is in the closed position (FIG. 2), it can be used as a mini-oven or toaster. The food to be cooked is placed on the depressed flat surface of one heating plate of one base and the other heating base is pivoted to the superposed closed position. When powered by A.C. one thermostat may be set to heat only one heating plate for cooking or heating one side of the food, or both thermostats may be set to cook or heat both surfaces of the food simultaneously or at different temperatures. If the food is frozen, both A.C. thermostats may be set on a high temperature to quickly defrost the food, and then after defrosting, one or both thermostats can be set to the proper cooking or heating temperature. In the closed position, the apparatus can be used to cook TV dinners, steaks, sandwiches, and other flat foods.

In the open position (FIG. 1), the cooking apparatus can be used as a grill, hibachi, or miniature barbecue pit. Foods can be cooked on one heating plate and the other heating plate may be used for warming or toasting buns, or cooking other foods. A fry pan may be placed on one heating plate and a pot on the other heating plate. In this arrangement, various different types of foods can be cooked at the same time. For example, the fry pan can be used for baking casseroles, frying bacon, eggs, etc., while the pot is used for cooking a soup or stew, etc. It should be understood that conventional pots and pans may be used with the present cooking apparatus.

While this invention has been described fully and completely with special emphasis upon preferred embodiments, it should be understood that within the scope of the appended claims the invention may be practiced otherwise than as specifically described herein.

What is claimed is:

1. A portable D.C. electric cooking apparatus for use in cooking a variety of foods by various methods utilizing direct current and conductive heating, comprising:

a first and second pan-shaped housing member each having a bottom wall and a side wall;

a first and second heat conductive metallic heating plate each carried by a respective said first and second housing member, each having an underside disposed within a respective said housing member and an outward facing side with a central recessed flat surface on the outward facing side surrounded by a raised side wall;

a first and second D.C. electrical heating element, each secured in contact with the underside of a respective said first and second heating plate to heat said respective first and second heating plate by thermal conduction when energized, and each having a first and a second terminal;

means for connecting said first and second terminal of said first and second heating element with a D.C. electrical power source to energize said first and second heating element with polarized direct current;

a first and second D.C. thermostat control means each connected in series between a respective said first terminal of said first and second heating element and said D.C. electrical power source for controlling the temperature of said first and second heating element independently; and hinge means disposed between said first and second heating plates and said first and second housing members whereby said housing members and said heating plates carried thereby may be pivoted between an open position laterally adjacent one another and a closed position superposed one above the other with said recessed flat surfaces of said first and second heating plates positioned in opposite facing vertically spaced relation and their said surrounding raised side walls defining a central cavity in the closed position.

2. The portable D.C. electric cooking apparatus according to claim 1, wherein said first and second D.C. electrical heating element each comprise a D.C. resistance type heating element having a heat output rating in the range of from about 150 watts to about 200 watts.

3. The portable D.C. electric cooking apparatus according to claim 1, wherein said means for connecting said first and second terminal of said first and second heating element with a D.C. electrical power source comprises a D.C. receptacle electrically connected with said first and second heating elements and said first and second D.C. thermostats and adapted to receive a plug electrically connected with a D.C. power source.

4. The portable D.C. electric cooking apparatus according to claim 1, wherein said means for connecting said first and second terminal of said first and second heating element with a D.C. electrical power source comprises an insulated cable having leads electrically connected at one end with said first and second D.C. heating elements and said first and second D.C. thermostats and each having an opposite end adapted to be electrically connected with a D.C. power source.

5. The portable D.C. electric cooking apparatus according to claim 1, further comprising:

handle means extending laterally from at least one of said first and second housing member side wall to serve as a carrying handle when said housing members are in the closed position.

6. The portable D.C. electric cooking apparatus according to claim 1, further comprising:

a horizontal shoulder at the top of each said first and second heating plate raised side wall;

said recessed flat surface, said raised side wall, and said shoulder of said first and second heating plate defining a mounting surface for receiving and supporting a cooking vessel having a bottom portion configured to mate therewith.

7. The portable D.C. electric cooking apparatus according to claim 6, further comprising:

at least one cooking vessel member having a bottom portion sized and shaped to mate with said recessed flat surface, said raised side wall, and said shoulder of each said first and second heating plate, said vessel being removably received and supported thereon in highly efficient conductive heat transfer relation.

8. A combination D.C. and A.C portable electric cooking apparatus capable of being selectively operated by either a D.C. or A.C. electrical power source for cooking a variety of foods by various methods utilizing conductive heating, comprising:

at least one pan-shaped housing member having a bottom wall and a side wall;

at least one metallic heat conductive heating plate carried by a respective said housing member and having an underside disposed within said housing member and an outward facing side with a central recessed flat surface on the outward facing side surrounded by a raised side wall;

at least one D.C. electrical heating element secured in contact with the underside of said heating plate to heat said heating plate by thermal conduction when energized, and having a first and second terminal;

at least one A.C. electrical heating element secured in contact with the underside of said heating plate adjacent said D.C. heating element to heat said heating plate by thermal conduction when energized, and having a first and second terminal;

means for connecting said first and second terminal of said D.C. electrical heating element with a D.C. electrical power source to energize said D.C. electrical heating element with polarized direct current;

means for connecting said first and second terminal of said A.C. electrical heating element with an A.C. electrical power source to energize said A.C. electrical heating element with alternating electrical current;

at least one D.C. thermostat control means connected between said first terminal of said D.C. electrical heating element and said D.C. electrical power source for controlling the temperature of said D.C. electrical heating element; and at least one A.C. thermostat control means connected between said first terminal of said A.C. electrical heating element and said A.C. electrical power source for controlling the temperature of said A.C. electrical heating element.

9. The combination D.C. and A.C portable electric cooking apparatus according to claim 8, comprising:

a first and second said pan-shaped housing member each having a bottom wall and a side wall;

a first and second said heat conductive metallic heating plate each carried by a respective said first and second housing member, each having an underside disposed within a respective said housing member and an outward facing side with a central recessed flat surface on the outward facing side surrounded by a raised side wall;

a first and second said D.C. electrical heating element each secured in contact with the underside of a respective said first and second heating plate;

a first and second said A.C. electrical heating element each secured in contact with the underside of a respective said first and second heating plate adjacent a respective said D.C. electrical heating element;

a first and second said D.C. thermostat control means connected between a respective said D.C. electrical heating element and said D.C. electrical power source for controlling the temperature of said first and second D.C. electrical heating elements;

a first and second said A.C. thermostat control means connected between a respective said A.C. electrical heating element and said A.C. electrical power source for controlling the temperature of each said A.C. electrical heating element independently;

said means for connecting said first and second terminal of said D.C. electrical heating element includes means for connecting said first and second terminal of said first and second D.C. electrical heating elements with said D.C. electrical power source to energize said D.C. electrical heating elements with polarized direct current;

said means for connecting said first and second terminal of said A.C. electrical heating element includes means for connecting said first and second terminal of said first and second A.C. electrical heating elements with an A.C. electrical power source to energize said A.C. electrical heating elements with alternating electrical current; and hinge means disposed between said first and second heating plates and said first and second housing members whereby said housing members and said heating plates carried thereby may be pivoted between an open position laterally adjacent one another and a closed position superposed one above the other with said recessed flat surfaces of said first and second heating plates positioned in opposite facing vertically spaced relation and their said surrounding raised side walls defining a central cavity in the closed position.

10. The combination D.C. and A.C. portable electric cooking apparatus according to claim 8, wherein said D.C. electrical heating element comprises a D.C. resistance type heating element having a heat output rating in the range of from about 150 watts to about 200 watts.

11. The combination D.C. and A.C. portable electric cooking apparatus according to claim 8, wherein said means for connecting said first and second terminal of said first and second heating element with a D.C. electrical power source comprises a D.C. receptacle electrically connected with said D.C. heating element and said D.C. thermostat adapted to receive a plug electrically connected with a D.C. power source.

12. The combination D.C. and A.C. portable electric cooking apparatus according to claim 8, wherein said means for connecting said first and second terminal of said first and second heating element with a D.C. electrical power source comprises an insulated cable having leads electrically connected at one end with said D.C. heating element and said D.C. thermostat and having an opposite end adapted to be electrically connected with a D.C. power source.

13. The combination D.C. and A.C. portable electric cooking apparatus according to claim 8, further comprising:

at least one cooking vessel member having a bottom portion sized and shaped to mate with said recessed flat surface and said raised side wall of said heating plate and to be removably received and supported thereon in highly efficient conductive heat transfer relation.

14. A D.C. electric cooking system for vehicles and boats having a D.C. electrical system powered by a battery, for cooking a variety of foods by various methods utilizing direct current and conductive heating, comprising:

at least one pan-shaped housing member having a bottom wall and a side wall;

at least one heat conductive metallic heating plate carried by a respective said housing member and having an underside disposed within said housing member and an outward facing side with a central recessed flat surface on the outward facing side surrounded by a raised side wall;

at least one D.C. electrical heating element secured in contact with the underside of said heating plate to heat said heating plate by thermal conduction when energized, and having a first and second terminal;

means for connecting said first and second terminal of said D.C. electrical heating element with said vehicle D.C. electrical system to energize said D.C. electrical heating element with polarized direct current; and at least one D.C. thermostat control means connected between said first terminal of said D.C. electrical heating element and said vehicle D.C. electrical system for controlling the temperature of said D.C. electrical heating element.

15. The D.C. electric cooking system for vehicles and boats according to claim 14, comprising:

a first and second said pan-shaped housing member each having a bottom wall and a side wall;

a first and second said heat conductive metallic heating plate each carried by a respective said first and second housing member, each having an underside disposed within a respective said housing member and an outward facing side with a central recessed flat surface on the outward facing side surrounded by a raised side wall;

a first and second said D.C. electrical heating element each secured in contact with the underside of a respective said first and second heating plate;

a first and second said D.C. thermostat control means connected between a respective said first and second D.C. electrical heating element and said vehicle D.C. electrical system for controlling the temperature of said first and second D.C. electrical heating elements; and hinge means disposed between said first and second heating plates and said first and second housing members whereby said housing members and said heating plates carried thereby may be pivoted between an open position laterally adjacent one another and a closed position superposed one above the other with said recessed flat surfaces of said first and second heating plates positioned in opposite facing vertically spaced relation and their said surrounding raised side walls defining a central cavity in the closed position.

16. The D.C. electric cooking system for vehicles and boats according to claim 14, wherein said D.C. electrical heating element comprises a D.C. resistance type heating element having a heat output rating in the range of from about 150 watts to about 200 watts.

17. The D.C. electric cooking system for vehicles and boats according to claim 14, further comprising:

a D.C. receptacle on said vehicle electrically connected with said vehicle battery; and an insulated cable having leads electrically connected at one end with said D.C. heating element and said D.C. thermostat and having a plug at an opposite end adapted to be received in said D.C. receptacle.

18. The D.C. electric cooking system for vehicles and boats according to claim 14, further comprising:

at least one cooking vessel member having a bottom portion sized and shaped to mate with said recessed flat surface and said raised side wall of said heating plate and to be removably received and supported thereon in highly efficient conductive heat transfer relation.

* * * * *